(12) United States Patent
Lemmon et al.

(10) Patent No.: US 7,910,158 B2
(45) Date of Patent: Mar. 22, 2011

(54) METHOD FOR FABRICATING AN ARRAY OF ELECTRODE AND ELECTROLYTE MATERIALS FOR USE IN SOLID OXIDE FUEL CELLS

(75) Inventors: John Lemmon, Schoharie, NY (US); Chang Wei, Niskayuna, NY (US); Venkat Venkataramani, Clifton Park, NY (US); James Ruud, Delmar, NY (US); Wayne Hasz, Pownal, VT (US); Anthony Thompson, Niskayuna, NY (US); Curtis Johnson, Niskayuna, NY (US); Oltea Siclovan, Rexford, NY (US); Canan Hardwicke, Niskayuna, NY (US); Stephen Rutkowski, Duanesburg, NY (US); Melvin Jackson, Niskayuna, NY (US); Michael Pilliod, Pittsfield, NY (US)

(73) Assignee: General Electric Company, Niskayuna, NY (US)

(*) Notice: Subject to any disclaimer, the term of this patent is extended or adjusted under 35 U.S.C. 154(b) by 3059 days.

(21) Appl. No.: 10/268,420

(22) Filed: Oct. 10, 2002

(65) Prior Publication Data
US 2004/0068865 A1    Apr. 15, 2004

(51) Int. Cl.
*B05D 5/12* (2006.01)
*B05D 3/02* (2006.01)

(52) U.S. Cl. .......... 427/115; 427/256; 427/372.2
(58) Field of Classification Search .......... 427/115, 427/256, 421.1, 372.2
See application file for complete search history.

(56) References Cited

U.S. PATENT DOCUMENTS

| | | | |
|---|---|---|---|
| 5,480,739 A * | 1/1996 | Kawasaki et al. | 429/33 |
| 6,251,473 B1 * | 6/2001 | Wang et al. | 427/126.3 |
| 6,677,070 B2 * | 1/2004 | Kearl | 429/33 |
| 6,818,134 B2 * | 11/2004 | Lemmon et al. | 210/656 |
| 6,881,363 B2 * | 4/2005 | Carlson et al. | 264/40.1 |
| 6,921,557 B2 * | 7/2005 | Jacobson et al. | 427/376.1 |
| 2002/0028371 A1 * | 3/2002 | Tang et al. | 429/40 |
| 2004/0062142 A1 * | 4/2004 | Wei et al. | 366/177.1 |
| 2006/0269824 A1 * | 11/2006 | Hampden-Smith et al. | 429/40 |

* cited by examiner

*Primary Examiner* — Brian K Talbot
(74) *Attorney, Agent, or Firm* — Francis T. Coppa

(57) ABSTRACT

The present invention provides high-throughput systems and methods for the fabrication and evaluation of electrode and electrolyte materials for solid oxide fuel cells. The present invention includes systems and methods for synthesizing and optimizing the performance of electrodes and electrode-electrolyte combinations and utilizes small-scale techniques to perform such optimization based on chemical composition and variable processing. Advantageously, rapid device performance systems and methods coupled with structural and surface systems and methods allow for an increased discovery rate of new materials for solid oxide fuel cells.

13 Claims, 8 Drawing Sheets

METHOD FOR FABRICATING AN ARRAY OF ELECTRODE AND ELECTROLYTE MATERIALS FOR USE IN SOLID OXIDE FUEL CELLS

FIELD OF THE INVENTION

The present invention relates generally to solid oxide fuel cells and associated large-scale power generation, distributed power, and vehicular applications. More specifically, the present invention relates to systems and methods for the fabrication and optimization of electrode and electrolyte materials for use in solid oxide fuel cells.

BACKGROUND OF THE INVENTION

A solid oxide fuel cell ("SOFC") is an electrochemical device that may be used in, for example, large-scale power generation, distributed power, and vehicular applications. One of the key challenges in developing a SOFC is developing high-performance electrode and electrolyte materials that meet SOFC performance and cost requirements. While there are lists of potential candidate materials for both electrodes and electrolytes, significant efforts are required to optimize material combinations, chemical compositions, processing conditions, and the like. This is especially true as the vast majority of such potential candidate materials are either ternary or quaternary-based.

For example, yttria-stabilized zirconia ("YSZ") is commonly used as an electrolyte material in SOFCs. However, electrolyte performance is relatively sensitive to the ratio of Y to Zr, and this component ratio must be carefully optimized. The same is true for other potential candidate materials for electrolytes, including Sr-doped CeO2, CGO, and the like. Electrode material composition is also critical to the performance of a SOFC. For example, the composition of $La_xSr_{1-x}MnO$ (3-d) ("LSM"), a common cathode material, may greatly affect its electrical conductivity and electrochemical activity.

Typically, various combinations of elements or components with varying chemical compositions are individually formulated and tested in order to achieve optimal performance for electrode and electrolyte materials, a relatively slow, labor-intensive, and costly process. Thus, what is needed are high-throughput systems and methods that make SOFC-related materials development more efficient. The systems and methods of the present invention use a combinatorial or small-scale approach to achieve the high-throughput fabrication, evaluation, and optimization of electrode and electrolyte materials for use in SOFCs.

Likewise, although SOFCs are a promising technology for producing electrical energy from fuel with relatively high efficiency and low emissions, one of the barriers to the widespread commercial use of SOFCs is their relatively high manufacturing cost. This manufacturing cost is driven primarily by the need for state-of-the-art fuel cells capable of operating at relatively high temperatures (approximately 1,000 degrees C.). Such fuel cells are expensive to manufacture. A reduction in the operating temperature of SOFCs would enable the widespread use of this power generation technology.

One of the barriers to a reduction in the operating temperature of SOFCs is the efficiency of the common cathode material, LSM. At intermediate temperatures, the cathodic polarization of LSM is relatively high, leading to large efficiency losses. Thus, new cathode compositions with lower activation polarizations are needed. However, standard ceramic processing techniques for fabricating new cathode compositions are time consuming and costly. Typically, new powder compositions are synthesized in a plurality of steps, including precipitation, filtration, and calcining. Because the microstructure (i.e., the porosity) of the cathode structure contributes substantially to its performance, careful processing of the powder must be performed in order to produce cathode structures with uniform microstructures. The expense associated with synthesizing such ceramic powders limits the number of cathode compositions that may be fabricated and evaluated.

Thus, what is needed are systems and methods that allow for the rapid synthesis of a large range of cathode compositions on a small scale. The systems and methods of the present invention use continuously varying compositions of inorganic or organic salt solutions, such as nitrates, applied to a porous YSZ structure to rapidly produce sets of compositions suitable for high-throughput screening and analysis.

BRIEF SUMMARY OF THE INVENTION

In various embodiments, the present invention provides high-throughput systems and methods for the fabrication and evaluation of electrode and electrolyte materials for use in solid oxide fuel cells ("SOFCs"). The present invention includes systems and methods for synthesizing, evaluating, and optimizing the performance of such electrodes and electrode-electrolyte combinations and uses small-scale techniques to perform such synthesis, evaluation, and optimization based on variable chemical composition and processing. Advantageously, rapid device performance systems and methods coupled with structural and surface systems and methods allow for increased rates of discovery for new materials for use in SOFCs.

In various embodiments, the present invention also provides systems and methods for fabricating a wide range of SOFC cathode materials for the high-throughput screening and analysis of material compositions. Specifically, the systems and methods include producing a porous yttria-stabilized zirconia ("YSZ") layer on a dense YSZ electrolyte layer and infiltrating the porous YSZ layer with a plurality of precursor solutions, such as nitrate solutions. These precursor solutions may be mixed in continuously varying compositions or spatially resolved to produce a wide range of oxide compositions after a reaction step. The porous YSZ layer is maintained during fabrication to provide a stable microstructure permeable to gas. Advantageously, the nitrate solutions described above are relatively simple to prepare, mix, and react to form the oxide compositions. Also, the porous YSZ layer determines the cathode microstructure independent of the composition of the cathode material, allowing for the reliable comparison of the relative performance of each of the materials of the array. Further, the porous YSZ layer makes it possible to produce high-quality oxide coatings from the precursor solutions even after the solutions undergo a large volume contraction upon reaction.

In various embodiments, the present invention further provides facile and rapid techniques for synthesizing multi-compositional inorganic materials generally. These techniques may be used to discover new inorganic materials for use in SOFCs (such as electrodes, electrolytes, interconnects, seals, and the like), phosphors, scintillators, PZT materials, and the like. The techniques allow for the synthesis and analysis of gradient or spatially resolved compositions that may be used to offset non-steady-state applications. The synthesis of these materials involves depositing metal oxide slurries, with or without binder/plasticizer combinations, onto a substrate via the use of syringe pumps. The plurality of slurries of varying compositions may be mixed together by combining flows. The flow rates may be varied to create a gradient composition as a function of time. This gradient composition may be captured by drawing the slurry with an x-y-z stage or micropen, or into another syringe loading at the same rate of infusion. In the case of drawing the composition with a movable stage, the material may be sintered as a one-piece, continuous array or as discrete regions or "spots". Molar ratios in the continuous ceramic array may be calculated as a function of distance by determining the rate of infusion, stage rate, stage travel distance, and slurry concentration.

In one embodiment of the present invention, a method for the fabrication of an array of electrode or electrolyte materials suitable for use in a solid oxide fuel cell includes providing a non-sintered or partially-sintered substrate; using capillary forces to deliver one or more materials to a plurality of regions of the substrate, wherein the one or more materials create a plurality of regions of differing chemical composition within the substrate, wherein the plurality of regions of differing chemical composition form the array; and sintering the substrate.

In another embodiment of the present invention, a system for the fabrication of an array of electrode or electrolyte materials suitable for use in a solid oxide fuel cell includes a liquid handling device operable for delivering one or more materials to a plurality of regions of a non-sintered or partially-sintered substrate; a mask operable for controlling which of the plurality of regions of the substrate receive the one or more materials; and a vacuum device operable for drawing the one or more materials into the interior of the substrate.

In a further embodiment of the present invention, a method for the fabrication and evaluation of an array of solid oxide fuel cells includes attaching a host material to an anode material, wherein the host material displays a desired electrolyte performance characteristic; selectively doping a plurality of regions of the host material with a predetermined chemical species, wherein each of the plurality of doped regions of the host material forms a cathode material, and wherein the plurality doped regions of the host material form an array of electro-active compositions; wherein the cathode material is disposed adjacent to and in a spaced-apart relationship with the anode material; and sintering the array of solid oxide fuel cells.

In a still further embodiment of the present invention, a method for determining the relative performance of a plurality of cathode compositions for use in solid oxide fuel cells includes providing a substrate, wherein the substrate comprises a dense electrolyte having a cathode-side and a counter electrode-side; disposing a porous layer on the cathode-side of the dense electrolyte, wherein the porous layer is positioned distally from the counter electrode-side; infiltrating a predetermined amount of each of a plurality of precursor solutions into a plurality of regions of the porous layer, forming a plurality of potential cathode compositions within the substrate; reacting the plurality of precursor solutions, forming oxides; and measuring the relative performance of each of the plurality of cathode compositions.

In a still further embodiment of the present invention, a high-throughput method for fabricating an array of materials suitable for use in a solid oxide fuel cell, wherein each of a plurality of members of the array of materials may be evaluated for its relative performance, includes providing a plurality of components; delivering a predetermined amount of each of the plurality of components to the surface of a substrate, wherein the predetermined amount of each of the plurality of components is delivered to the surface of the substrate from a common location; moving the substrate relative to the common location; and reacting the plurality of components.

In a still further embodiment of the present invention, a high-throughput system operable for fabricating an array of materials suitable for use in a solid oxide fuel cell, wherein each of a plurality of members of the array of materials may be evaluated for its relative performance, includes a plurality of devices operable for delivering a predetermined amount of each of a plurality of components to the surface of a substrate, wherein the predetermined amount of each of the plurality of components is delivered to the surface of the substrate from a common location; a stage operable for moving the substrate relative to the common location; and means for reacting the plurality of components.

In a still further embodiment of the present invention, a method for the fabrication of an array comprising a plurality of electrode materials suitable for use in a solid oxide fuel cell, wherein each of plurality of electrode materials may be evaluated for its relative performance in a high-throughput manner, includes tape casting a dense electrolyte to a predetermined size; disposing a plurality of porous regions on a first surface of the dense electrolyte; sintering the dense electrolyte and the plurality of porous regions at a first predetermined temperature; infiltrating the plurality of porous regions with soluble metal solutions; attaching a reference electrode to a second surface of the dense electrolyte; and sintering the dense electrolyte, the plurality of porous regions, and the reference electrode at a second predetermined temperature.

DETAILED DESCRIPTION OF THE INVENTION

As described above, in various embodiments, the present invention provides high-throughput systems and methods for the fabrication and evaluation of electrode and electrolyte materials for use in solid oxide fuel cells ("SOFCs"). The present invention includes systems and methods for synthesizing, analyzing, and optimizing the performance of such materials and components, including electrodes and electrode-electrolyte combinations, and utilizes small-scale techniques to perform such synthesis, analysis, and optimization based on chemical composition and variable processing. Advantageously, rapid device performance systems and methods coupled with structural and surface systems and methods allow for an increased rate of discovery of new materials for use in SOFCs.

In one embodiment, the systems and methods of the present invention are based on the use of an infiltration technique that relies on capillary and/or vacuum forces to create small regions or "spots" of varying chemical compositions. This technique allows for the equal distribution of metal ions or combinations of metal ions into a substrate. The substrate may be, for example, a porous or nonporous green ceramic or plastic. When applied with a vacuum-assisted draw, the infiltrated spots create a discrete, homogenous chemical composition. When applied to a non-sintered (green) ceramic or plastic, the systems and methods of the present invention allow for the addition of chemical species that may enhance a physical or chemical property once the material is sintered. Physical properties that may be affected include, for example, electrical or ionic conductivity, pore size, and pore density.

Figure 1:
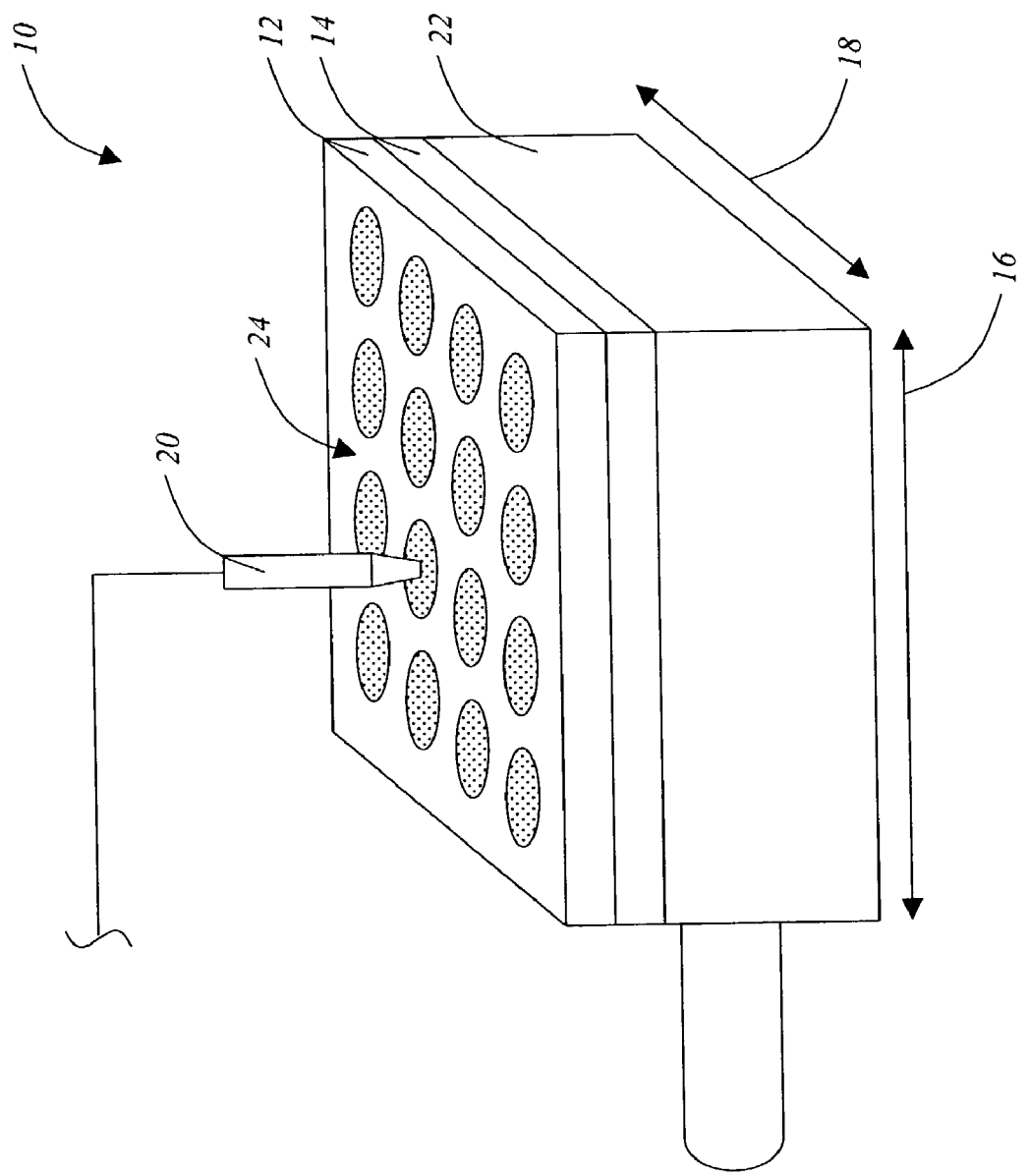
FIG. 1 is a schematic diagram of one embodiment of a high-throughput system operable for fabricating an array of electrode materials, electrolyte materials, or solid oxide fuel cells suitable for relative performance evaluation, the system using capillary and/or vacuum forces to create small regions of varying chemical composition.

Referring to FIG. 1, the system 10 includes a substrate 12 disposed on top of or adjacent to a mask 14. As described above, the substrate 12 may be a porous or nonporous, non-sintered green ceramic or plastic, typically in powder form. The porosity of the substrate 12 may be varied using a pore-former or the like. Optionally, the substrate 12 may be partially sintered. Typically, the mask 14 includes a plate, sheet, film, coating, or the like having a plurality of holes (not shown) disposed therethrough or openings (not shown) disposed therein. Each of the plurality of holes or openings may be, for example, substantially circular, oblong, square, rectangular, triangular, etc. The mask 14 is disposed adjacent to a surface of the substrate 12 such that material passing through each of the plurality of holes is selectively prevented or shielded from contacting predetermined regions of the surface of the substrate 12. The substrate 12 may have a length 16 of about 1-3 inches and a width 18 of about 0.25-1.25 inches, however, other dimensions may be used.

A liquid handling device 20 operable for delivering one or more materials to a surface of the substrate 12 in liquid form is positioned above or adjacent to the surface of the substrate 12. The liquid handling device 20 may work via positive pressure, expelling the one or more materials towards the surface of the substrate 12, or, alternatively, the liquid handling device 20 may be in direct contact with the surface of the substrate 12, allowing the one or more materials to be drawn out of the liquid handling device 20 via capillary forces. Preferably, the liquid handling device 20 is movable relative to the surface of the substrate 12 such that the one or more materials may be delivered to predetermined regions of the surface of the substrate 12. Optionally, these predetermined regions may correspond to the locations of the plurality of holes or openings of the mask 14. The one or more materials in combination with the substrate 12 form an array 24.

Figure 2:
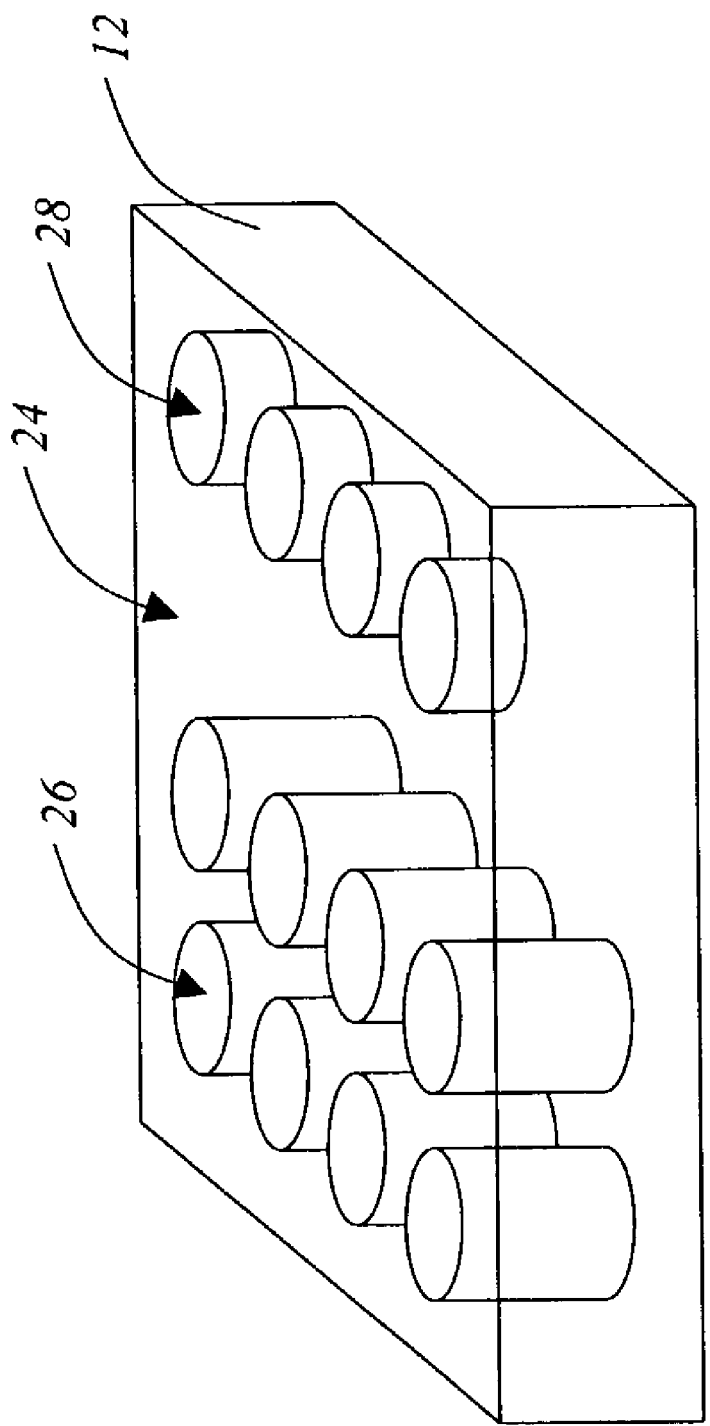
FIG. 2 is a schematic diagram further illustrating a potion of the array of electrode materials, electrolyte materials, or solid oxide fuel cells produced by the system of FIG. 1.

The substrate 12 and the mask 14 may be disposed on top of or adjacent to a vacuum device 22 operable for providing a vacuum force to assist in drawing the one or more materials partially into or completely through the porous substrate 12. Referring to FIG. 2, the array 24 may include a first plurality of infiltrated regions 26 that pass completely through the substrate 12 and/or a second plurality of infiltrated regions 28 that pass partially through the substrate 12.

In an exemplary embodiment, a transporting property of electrons in a material may be activated or enhanced by the addition of a chemical species or combinations of such species. More specifically, an array of cathode materials, between about 700 and 2,000 microns in diameter and about 1,000 microns in thickness, may be formed for potential use in a SOFC. The array is synthesized by infiltrating premixed solutions of metal cations into the green ceramic or plastic. Replication of the arrays allows for the investigation of multi-processing variables. The individual compositions in a given array may be tested for conductivity and for catalytic activity in the presence of oxygen by monitoring the overpotential at various temperatures using a multi-probe instrument. Subsequent results allow for the ranking of composition and processing based on performance measurements. Materials with promising results may be further characterized in order to relate physical microstructure and performance using micro XRD, XRF, and TOF-SIMMS.

In another exemplary embodiment, an array of electro-active materials may be formed as described above. However, before sintering and before or after compositional doping, a chemical agent may be added to a spot of interest in an attempt to influence change in the microstructure of that spot. For example, an agent may be added that, after sintering, allows for variable control of porosity or packing density. This allows for both compositional and micro-structural control on a small scale. Relationships between microstructure, composition, and material performance may thus be discovered and optimized rapidly.

In a further exemplary embodiment, a host material that displays favorable SOFC electrolyte performance characteristics is attached to an anode material. As described above, the electrolyte is doped to form an array of electro-active compositions. Each premixed composition is infiltrated into the electrolyte such that a small space between the doped area (the cathode) and the anode (the undoped electrolyte) exists. The material is then sintered, allowing for the rapid fabrication of an array of fuel cells that contains an array of cathode materials, relatively thin electrolyte material, and a common anode. Such an arrangement allows for the direct measurement of performance, rather than an inferred measurement.

Figure 3:
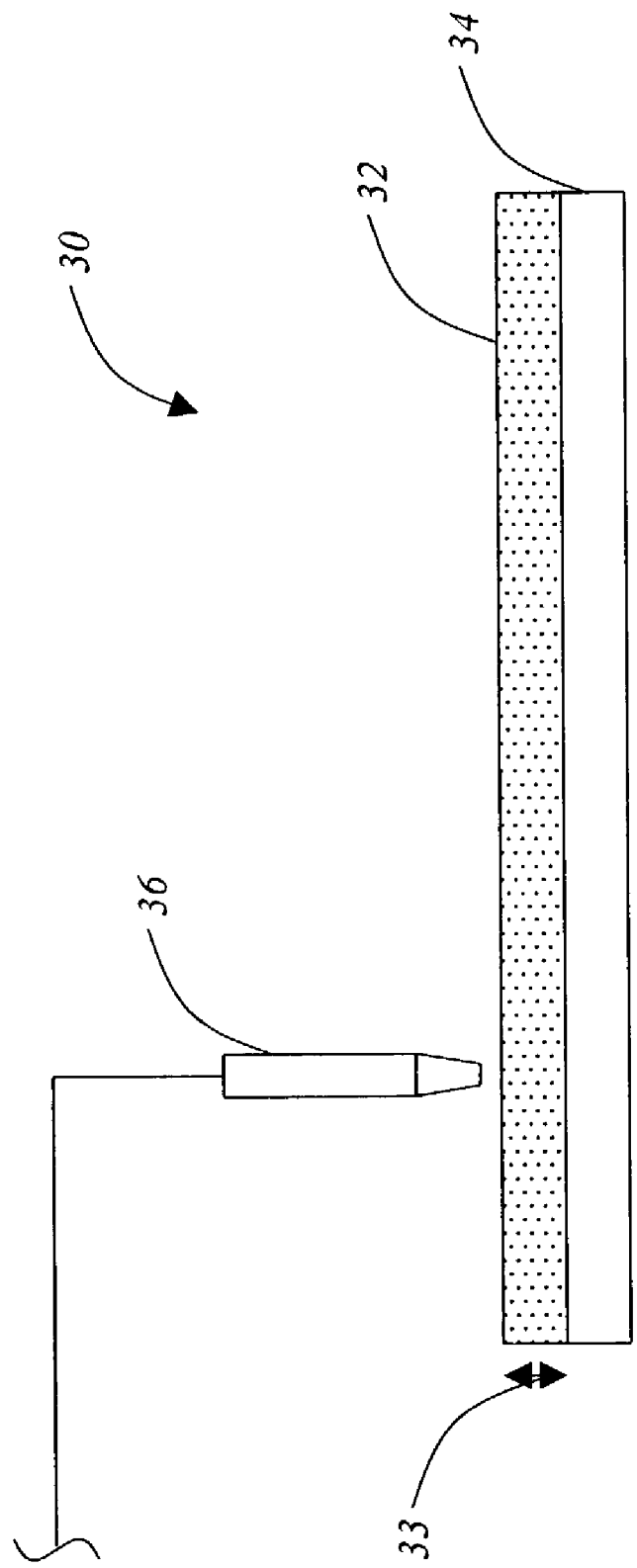
FIG. 3 is a schematic diagram of another embodiment of a high-throughput system operable for fabricating an array of electrode materials, electrolyte materials, or solid oxide fuel cells suitable for relative performance evaluation, the system using capillary forces to create small regions of varying chemical composition.

In another embodiment, the substrate of a cathode test structure of the present invention includes a dense yttria-stabilized zirconia ("YSZ") electrolyte and a counter electrode, i.e., an anode. Preferably, a porous YSZ layer 32 is disposed on the cathode-side of the YSZ electrolyte layer 34. The porosity of the YSZ layer 32 is controlled such that it is reproducible from one specimen to another. The porous YSZ layer 32 may have a thickness 33 of between about 10 and 1,000 microns. A precursor solution, such as a nitrate solution or the like with a desired cation, is provided in a metered amount and infiltrated into the porous YSZ layer 32 in a desired volume to produce a desired stoichiometry related to cathode composition. A liquid handling device 36 may be used for these purposes. Optionally, the liquid handling device 36 may be movable relative to the porous YSZ layer 32 and the YSZ electrolyte layer 34. This process is relatively easily automated such that the relative amounts of precursor solutions may be varied to produce a plurality of cathode compositions within the same substrate. The precursor solutions are then reacted to form oxides. The cathode test structure may be evaluated in any of the ways well known to those of ordinary skill in the art in order to determine the relative performance of the plurality of cathode compositions. This system 30 is illustrated in FIG. 3.

Advantageously, the systems and methods of the present invention are superior to simply depositing a range of compositions of precursor solutions on a dense YSZ electrolyte as, given such systems and methods, it is difficult to control the microstructure of the resulting oxide films following reaction because of the relatively large volume change that occurs. These variations in microstructure, as well as variations in concentration, make the relative performance of a plurality of cathode materials difficult to evaluate. Further, thick films made from precursors tend to spall upon reaction in air because of the relatively large volume change described above.

In a further embodiment, the systems and methods of the present invention provide for the deposition of colloids, slurries, pastes, or mixed organic/inorganic composites to form either a discrete or continuous gradient array of materials reacted on, with, or within a reactive or unreactive, porous or nonporous substrate. The compositional gradient array may be formed using, for example, pulseless mechanical pumping in which two or more deposition flow rates may be simultaneously controlled, thus providing the capability to control the amount and ratio of insoluble metal oxides, metal carbonates, ammonium slurries, or the like that form the bulk of a material and allowing for a wide range of continuously-produced compositions. This process is illustrated in FIG. 1.

Figure 4:
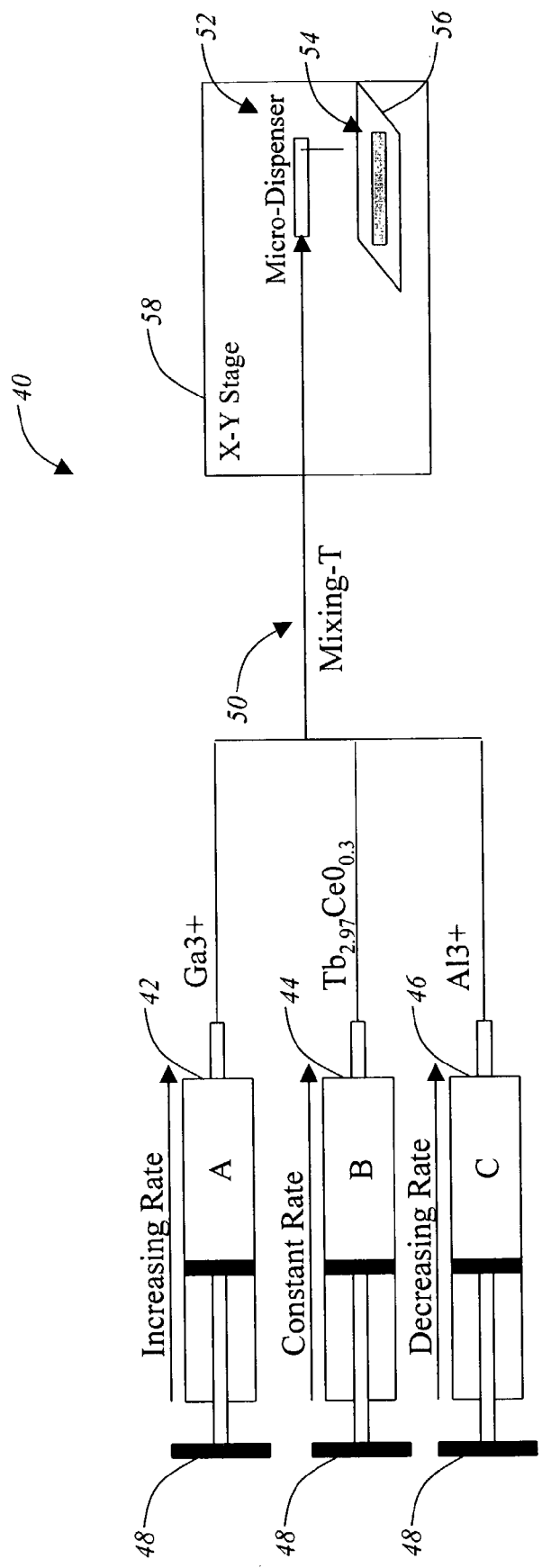
FIG. 4 is a schematic diagram of a further embodiment of a high-throughput system operable for fabricating an array of electrode materials, electrolyte materials, interconnect materials, or solid oxide fuel cells suitable for relative performance evaluation, the system using a plurality of delivery devices, a mixing device, a movable stage, and a dispensing device to create small regions of varying chemical composition.
Figure 5:
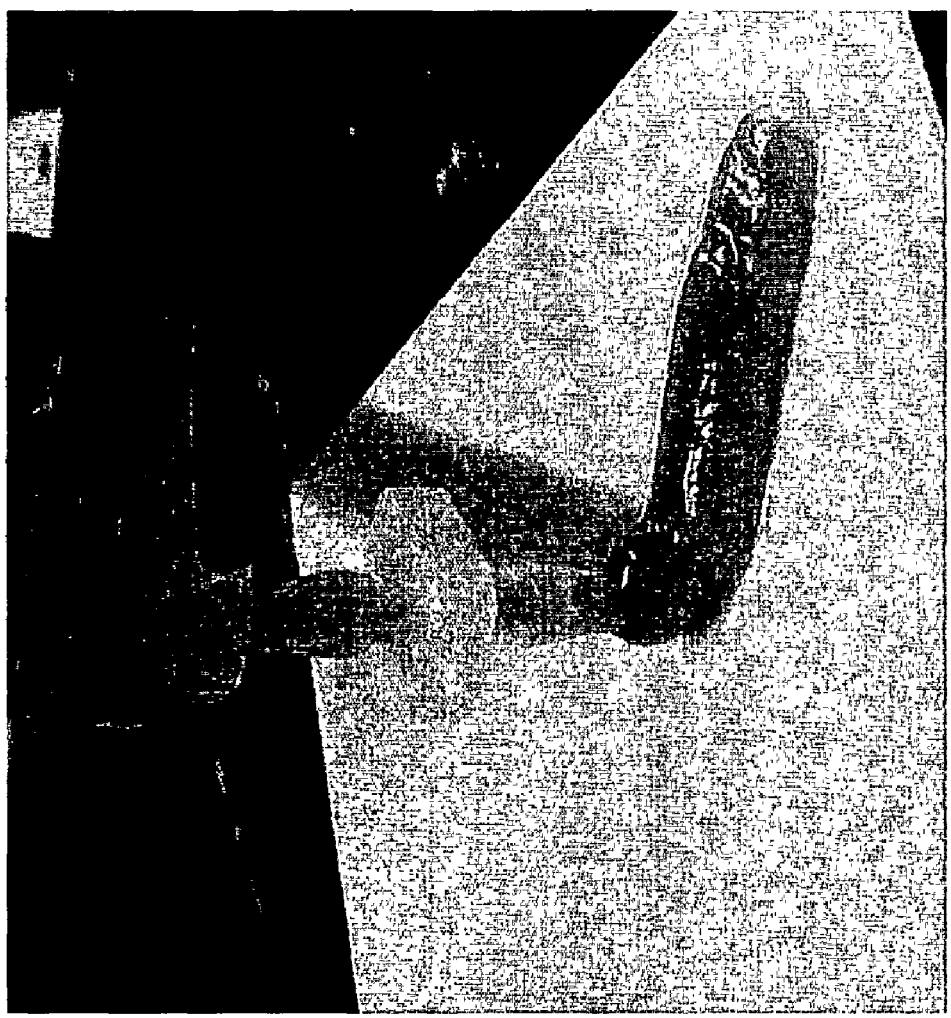
FIG. 5 is a photograph illustrating the deposition of a variable combination of a plurality of materials onto the surface of a substrate using the system of FIG. 4.
Figure 6:
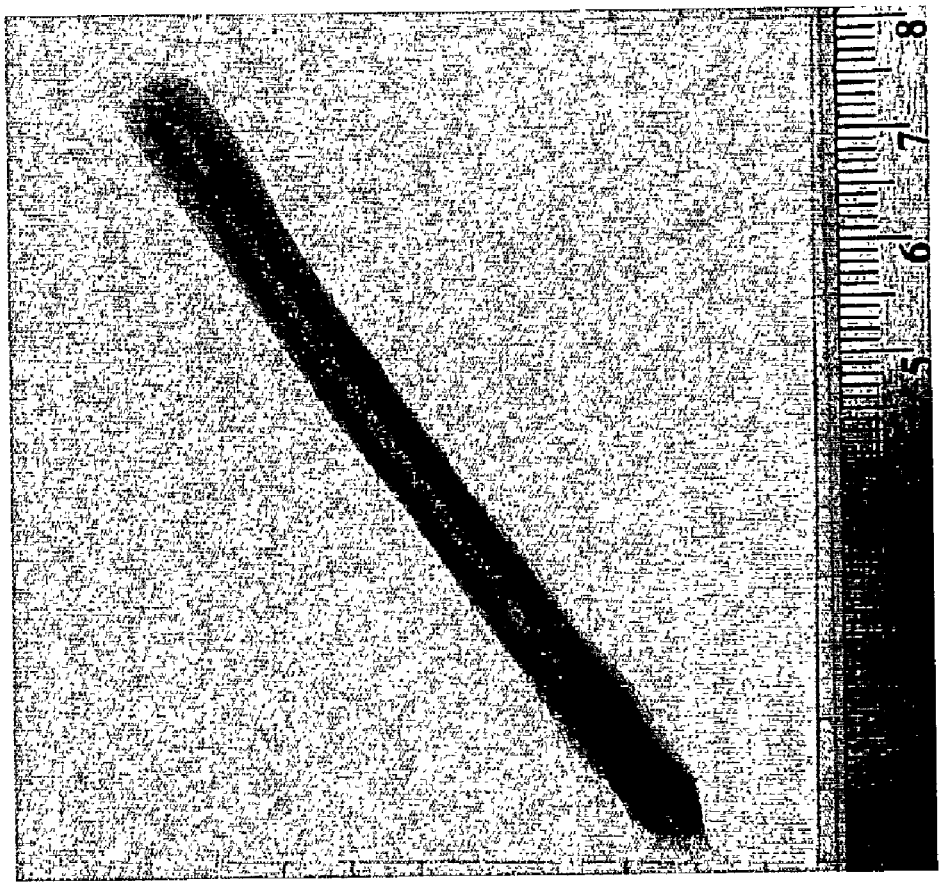
FIG. 6 is a photograph illustrating a gradient composition array formed by the system of FIG. 4.

Referring to FIG. 4, the system 40 of the present invention includes a plurality of materials, A 42, B 44, and C 46 in the example provided, disposed within a plurality of delivery devices 48 collectively operable for producing and delivering, via a mixing device or mixing-T 50 and a micro-dispenser 52 or the like, a colloid, slurry, paste, or mixed organic/inorganic composite to the surface 54 of a substrate 56 to form a discrete or continuous compositional gradient array of material when appropriately reacted. As described above, the plurality of materials 42, 44, 46 may be, for example, a plurality of insoluble metal oxides, metal carbonates, ammonium slurries, or the like. Optionally, the plurality of materials 42, 44, 46 may also include a plurality of binders and/or dispersing agents. The mixing device 50 may be a static mixer, such as a tube and baffle-type mixer, or a rotating mixer, such as a screw and barrel-type mixer. The compositional gradient array may be captured spatially using an x-y stage 58 or the like, either coupled to and acting on the substrate 56 or the micro-dispenser 52. The x-y stage 58 may also be operable for coordinating the deposition rate of the combination of the plurality of materials 42, 44, 46 with the rate of motion of the substrate 56. Discrete compositions may be created by interrupting the flow coordinated with the x-y stage 58. FIGS. 5 and 6 illustrate an example of the deposition of a combination of the plurality of materials 42, 44, 46 onto a substrate 56.

In various embodiments, the systems and methods described above enable bulk or thin film synthesis with controlled or continuous variations in temperature, concentration, and composition without the use of a high-vacuum apparatus. The sintering of metal salt mixtures may take place in-situ using a heated x-y stage 58 (FIG. 4), however, in most cases, post-deposition sintering is preferred. The facile, raid techniques of the present invention for making these materials promote the replication of compositional libraries, and thus the opportunity for processing with multiple variables, allowing an additional dimension in microstructural control.

Related to the synthesis of materials for use in SOFCs, where both chemical composition and microstructure are important variables, the use of metal slurries that contain metals for bulk and dopant purposes, along with organic binders or polymers for microstructural variation, may be envisioned. This gradient slurry technique may be used to investigate materials for use as electrodes, electrolytes, and ceramic interconnects used in SOFC manufacturing. In general, the techniques described above, however, may be used to investigate the relationship between physical properties and chemical composition related to a plurality of ceramic and composite applications in a high-throughput manner.

The techniques described above were verified using aluminum hydroxide slurries prepared by treating aluminum nitrate with ammonium hydroxide. Organic binders and plasticizers, such as polyethylene oxide and polyethylene glycol of various molecular weights, were added in the range of 4-8%. The slurry was divided into three parts and colored with food coloring. To ensure a fine dispersion and homogeneity, the slurries were sonicated with a sonicator probe. The slurries were then loaded into plastic syringes and placed on/within three syringe pumps. One syringe pump was set at a constant delivery rate, another at an increasing delivery rate, and the third at a decreasing delivery rate. The syringes were fitted with Teflon lines connected to a plastic four-way connector. Two static mixers were placed, one after the other, at the exit of the four-way connector. The tubing after the static mixers was connected to an x-y stage that was programmed to move at a predetermined rate in one dimension, such as to deliver the gradient slurry mixture as a line. The color acted as a verification of the gradient composition of the deposited slurry.

Figure 7:
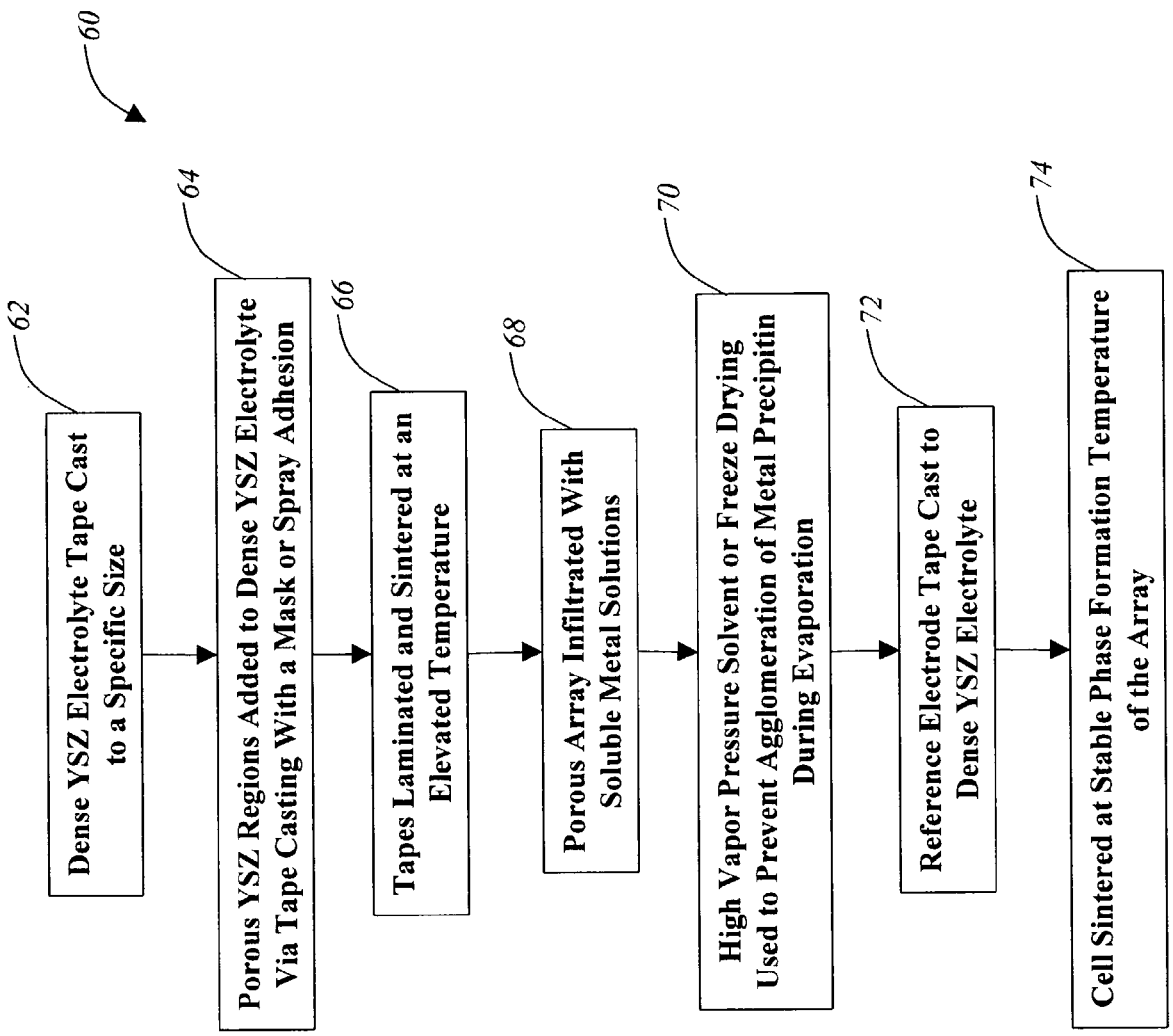
FIG. 7 is a flow chart of one embodiment of a method allowing for the rapid study of anode and cathode materials suitable for use in solid oxide fuel cells, the method using an electrolyte-supported cell.
Figure 8:
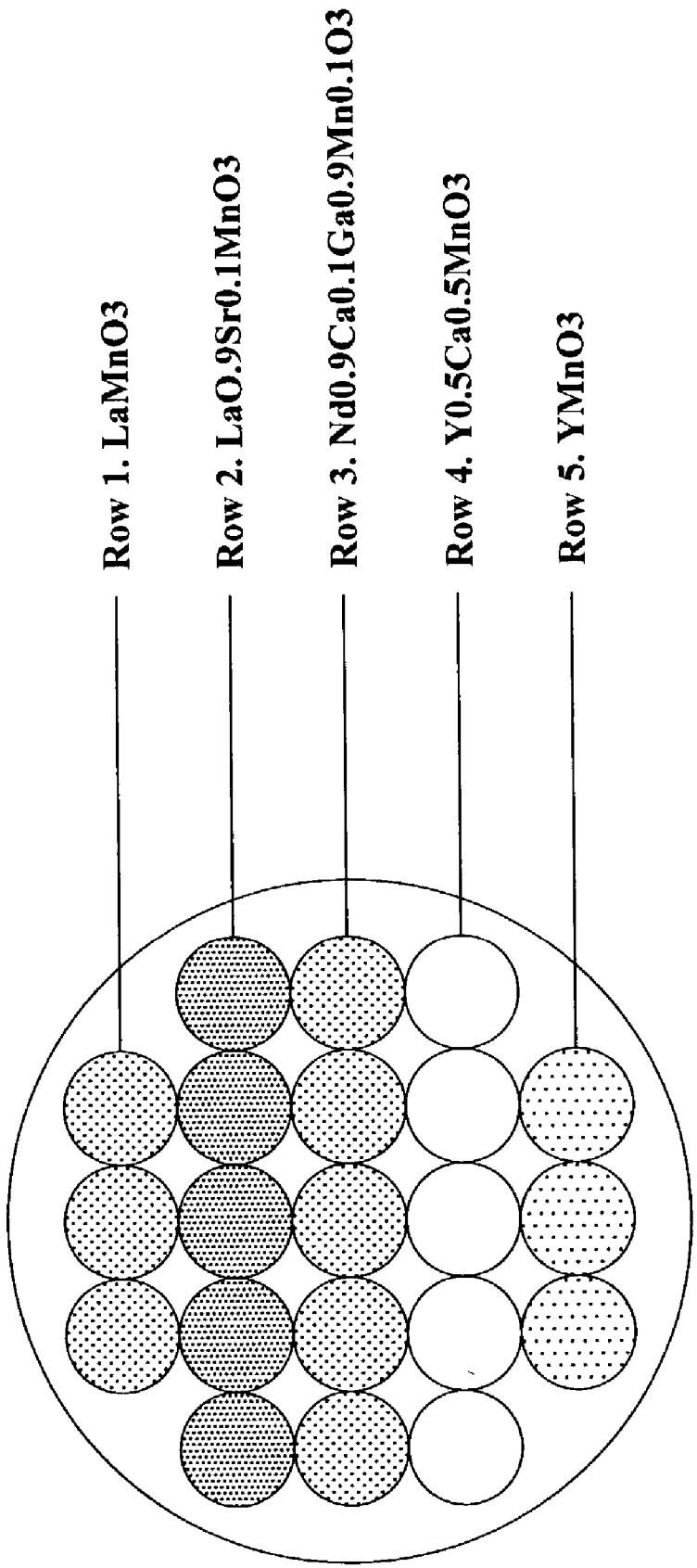
FIG. 8 is a photograph illustrating an electrolyte-supported cell associated with the method of FIG. 7.

In a still further embodiment, the systems and methods of the present invention allow for the rapid study of cathode and anode materials suitable for use in SOFCs, the systems and methods based on an electrolyte-supported cell. Referring to FIG. 7, in one embodiment of such a method 60, a dense YSZ electrolyte is tape cast to a specific size 62. Porous YSZ regions or "dots" are added to the green tape via tape casting using a mask or spray adhesion 64. In the case of tape casting the porous YSZ dots using a mask, the effects of microstructure may be optimized via a combinatorial investigation. The tapes are laminated and sintered at an elevated temperature 66, for example at about 1,450 degrees C., to achieve high electrolyte density. The porous array may then be infiltrated with soluble metal solutions taking into account the volume of the porous YSZ 68. In order to prevent agglomeration of the metal precipitin during evaporation, a high vapor pressure solvent or freeze drying may be used 70. Finally, an NiO anode or LaxSr1-xMnO (3-d) ("LSM") (reference electrode) is tape cast to the distal side of the dense YSZ electrolyte 72 and the cell is sintered at the stable phase formation temperature of the array 74. FIG. 8 illustrates a cell formed by this process.

It is apparent that there have been provided, in accordance with the systems and methods of the present invention, high-throughput techniques for the fabrication and optimization of electrode and electrolyte materials for use in solid oxide fuel cells. Although the systems and methods of the present invention have been described with reference to preferred embodiments and examples thereof, other embodiments and examples may perform similar functions and/or achieve similar results. All such equivalent embodiments and examples are within the spirit and scope of the present invention and are intended to be covered by the following claims.

What is claimed is:

1. A method for the fabrication of an array of electrode or electrolyte materials suitable for use in a solid oxide fuel cell, the method comprising the steps of:
   providing a non-sintered or partially-sintered substrate;
   infiltrating a porous layer disposed on a substrate by delivering one or more materials to a plurality of regions of the substrate, wherein the one or more materials create a plurality of regions of differing chemical composition within the substrate, wherein the plurality of regions of differing chemical composition form the array; and sintering the substrate.

2. The method of claim 1, wherein the substrate comprises a substrate selected from the group consisting of a green ceramic and a green polymer.

3. The method of claim 1, wherein using capillary forces to deliver the one or more materials to the plurality of regions of the substrate comprises using a vacuum-assisted draw to create a plurality of regions of discrete, homogenous chemical composition.

4. The method of claim 1, further comprising distributing a chemical species into the substrate, wherein the chemical species alters a physical or chemical property of each of the plurality of regions of differing chemical composition when sintered.

5. The method of claim 4, wherein distributing the chemical species into the substrate comprises distributing a chemical species selected from the group consisting of metal ions, metal cations, a combination of metal ions, and a combination of metal cations into the substrate.

6. The method of claim 4, wherein the physical property of each of the plurality of regions of differing chemical composition altered by the chemical species comprises a physical property selected from the group consisting of electrical conductivity, ionic conductivity, pore size, and pore density.

7. The method of claim 1, wherein the porous layer has a thickness between about 10 microns and about 1,000 microns.

8. The method of claim 1, further comprising testing each of the plurality of regions of differing chemical composition for conductivity and catalytic activity in the presence of oxygen by monitoring overpotential at a plurality of predetermined temperatures using a multi-probe instrument.

9. The method of claim 8, further comprising ranking the chemical composition and processing conditions of each of the plurality of regions of differing chemical composition in relation to their suitability for use in solid oxide fuel cells using the test results.

10. The method of claim 1, further comprising adding a chemical agent to a predetermined region of differing chemical composition, wherein the chemical agent is operable for altering the microstructure of the predetermined region of differing chemical composition.

11. The method of claim 7, wherein the porous layer comprises yttria-stabilized zirconia ("YSZ").

12. The method of claim 1, wherein the one or more materials are delivered to the porous layer via capillary forces.

13. The method of claim 1, wherein the one or more materials are delivered to the porous layer via positive pressure.

* * * * *